United States Patent [19]
Habegger et al.

[11] 3,880,298
[45] Apr. 29, 1975

[54] SORTING CONVEYOR CONTROL SYSTEM

[75] Inventors: James D. Habegger, Middleville; Andrew B. Huttula, Grand Rapids, both of Mich.

[73] Assignee: Rapistan, Incorporated, Grand Rapids, Mich.

[22] Filed: July 24, 1972

[21] Appl. No.: 274,566

[52] U.S. Cl. ............... 214/11 R; 198/38; 198/208
[51] Int. Cl. .......................................... B65g 47/00
[58] Field of Search ........... 214/11 R, 11; 198/208, 198/38; 33/147 L, 147 N, 134 A

[56] References Cited
UNITED STATES PATENTS

| | | | |
|---|---|---|---|
| 3,034,665 | 5/1962 | Speaker | 214/11 R |
| 3,096,871 | 7/1963 | Anderson | 214/11 R |
| 3,419,128 | 12/1968 | Leonard | 214/11 R |
| 3,491,903 | 1/1970 | Hedrick et al. | 214/11 R |
| 3,563,395 | 2/1971 | Gary | 214/11 C |
| 3,647,050 | 3/1972 | Neal | 198/208 |
| 3,696,946 | 10/1972 | Hunter et al. | 214/11 R |
| 3,725,867 | 4/1973 | Jordan | 214/11 R |

FOREIGN PATENTS OR APPLICATIONS

| | | | |
|---|---|---|---|
| 500,325 | 1/1951 | Belgium | 198/208 |
| 1,558,112 | 1/1969 | France | 198/208 |
| 773,184 | 4/1957 | United Kingdom | 198/208 |
| 85,416 | 6/1957 | Netherlands | 198/208 |

*Primary Examiner*—Robert J. Spar
*Assistant Examiner*—R. B. Johnson
*Attorney, Agent, or Firm*—Price, Heneveld Huizenga & Cooper

[57] ABSTRACT

An endless loop sorting conveyor includes a plurality of article carrying trays which receive randomly fed articles from one or more induction stations and selectively discharge the articles onto a plurality of discharge chutes adjacent the conveyor such that articles on trays identified by destination codes for the articles thereon will be sorted by discharging the articles onto correspondingly identified discharge chutes. A control circuit includes memory means for storing article destination codes and corresponding chute identification codes and receives tray position information from sensors positioned along the conveyor such that the instantaneous article carrying tray position with respect to the discharge chutes can be predicted. The control circuit actuates mechanisms for discharging articles onto discharge chutes when the trays are in alignment with correspondingly addressed chutes. A compensation control corrects for length variations of the sorting conveyor loop to insure accurate discharge of articles onto the chutes.

7 Claims, 14 Drawing Figures

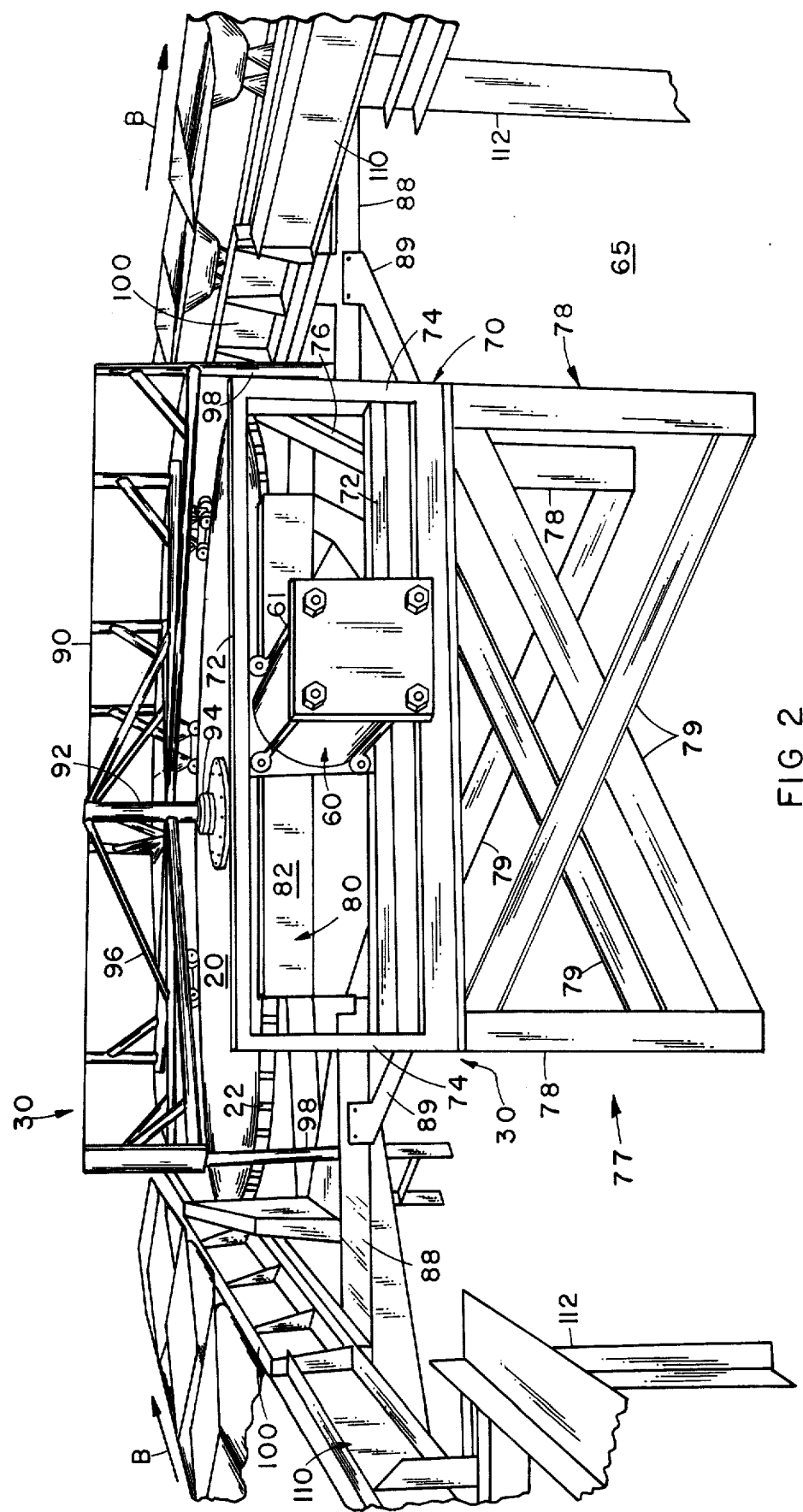

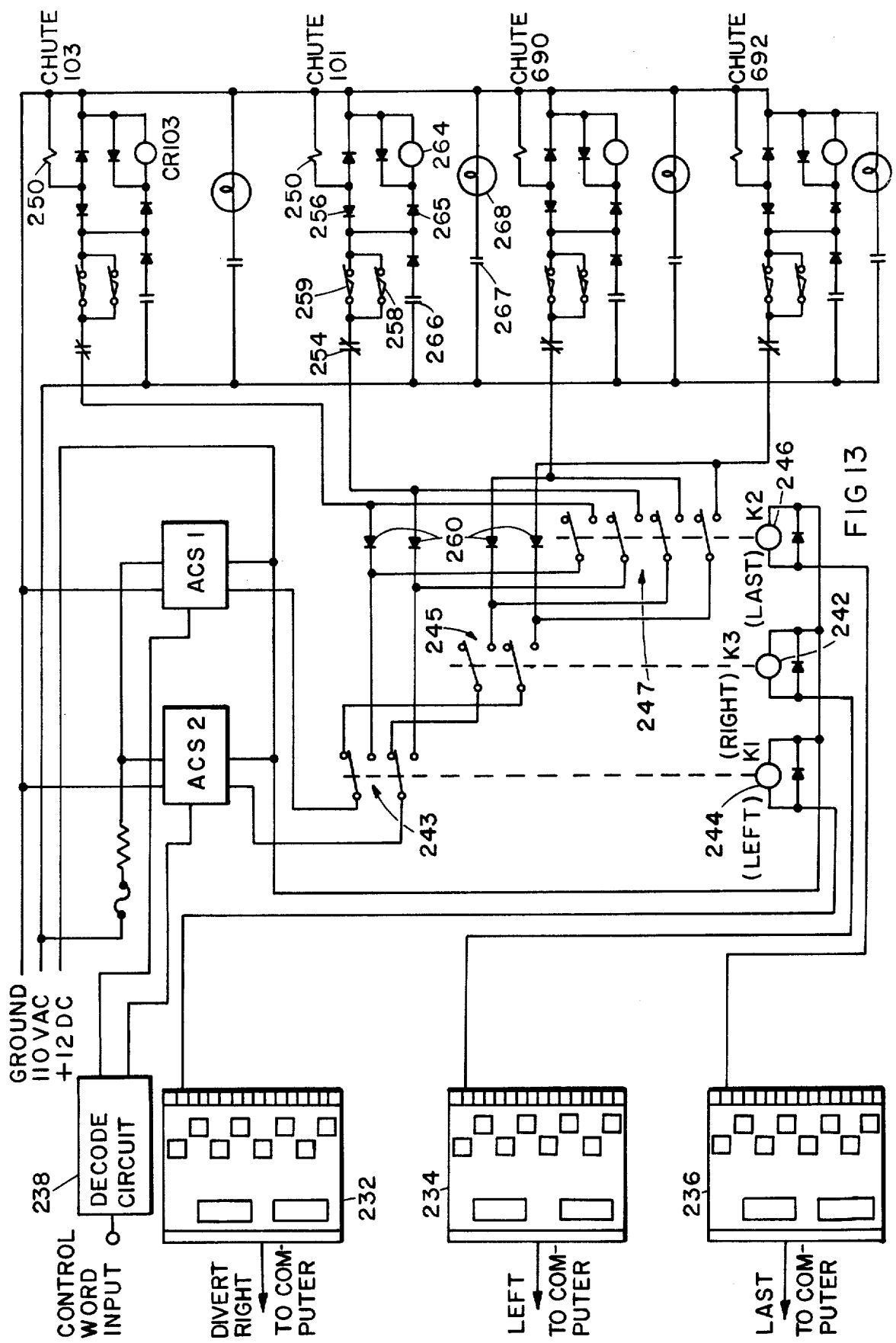

SORTING CONVEYOR CONTROL SYSTEM

BACKGROUND OF THE INVENTION

The present invention relates to a sorting conveyor system including control means for accurately distributing articles onto discharge chutes.

In sorting conveyor systems of the type employing an endless loop conveyor having a plurality of tiltable article carrying trays, it is necessary to rapidly and accurately induct randomly received articles to be sorted onto the trays of the conveyor. In addition, it is required to actuate tray tilting mechanism in timed coincidence with the alignment of an article carrying tray with a discharge chute onto which the article is to be transferred to complete the sorting function.

U.S. Pat. No. 3,034,665 issued May 15, 1962, to R. L. Speaker describes an electro-mechanical control system for identifying the discharge point of an article positioned on a tray and the position of the tray such that as the tray travels along the plurality of discharge chutes, it will be tilted when it is aligned with the assigned chute. Although such a system may perform adequately in some installations where the conveyor drive chain is not excessively long, and where a single induction station is employed with a relatively slow moving conveyor; such a system cannot be effectively used with a relatively high speed multiple induction system as described in copending applications entitled INDUCTION APPARATUS filed on Apr. 27, 1972, U.S. Ser. No. 248,260 by Jack R. Daigle, Mark G. Matthews and Howard A. Zollinger; and ARTICLE ALIGNING APPARATUS filed on Apr. 27, 1972, U.S. Ser. No. 248,301 by James F. Cutler, Wesley R. Maxted and Edward C. Soderstrom, both of which are assigned to the present assignee.

When the length of the sorting conveyor is relatively long, the drive chain can stretch over an interval of several feet during use. This changes the relative position of the trays to the sorting chutes for a given instant of time in the cycle of operation and can produce errors which prevent the proper transfer of articles on the relatively fast moving trays onto the stationary discharge chutes. Existing sorting conveyor control systems do not accommodate for conveyor chain length variations, nor can they operate effectively to efficiently utilize a multiplicity of discharge chutes in a high speed multiple induction system by simultaneously diverting different articles onto corresponding chutes.

SUMMARY OF THE INVENTION

By dividing the sorting conveyor into a plurality of discharge zones, and by utilizing a multiple divert pulse system; the control system of the present invention is capable of greatly increasing the article sorting capabilities of the basic sorting conveyor. This permits the most effective use of the system with multiple-induction stations and an increased number of discharge chutes. To accommodate for length variations which may result from the use of relatively long drive chains, a unique compensation control is provided.

The control system of the present invention includes means for calculating the instantaneous position of article carrying trays of the sorting conveyor from tray sensing or timing information. The timing information can be selectively varied by the compensation control for accommodating length variations of the loop conveyor to insure that the destination coded trays are in alignment with correspondingly coded discharge chutes. A divert control circuit selectively actuates diverting mechanism at a plurality of discharge locations to transfer articles positioned on trays into chutes corresponding to the desired discharge location for the article.

It is an object, therefore, of the present invention to provide an improved control system for an article sorting conveyor.

It is an additional object of the present invention to provide an endless loop sorting conveyor with loop length compensation control means.

Another object of the present invention is to provide a sorting conveyor which is segmented into discharge zones and a control which calculates the position of trays along the conveyor from timing information from tray sensing means and which simultaneously diverts articles in predetermined zones when preselected sensing means are actuated.

Still a further object of the present invention is to employ a sorting conveyor using discharge zones with alternately identified discharge locations having discharge chutes associated therewith to provide multiple simultaneous discharge of articles at preselected similarly identified discharge locations.

These and other objects of the present invention will become apparent upon reading the following specification together with the accompanying drawings.

BRIEF DESCRIPTION OF THE DRAWINGS

FIG. 2 is a fragmentary perspective view of the movable chain take-up assembly at the right end of the system shown schematically in FIG. 1;

FIG. 13 is an electrical circuit diagram partially in block and schematic form showing the control circuits for use in controlling some of the diverters for some of the discharge chutes shown in FIG. 9.

DETAILED DESCRIPTION OF THE PREFERRED EMBODIMENT

Figure 1:
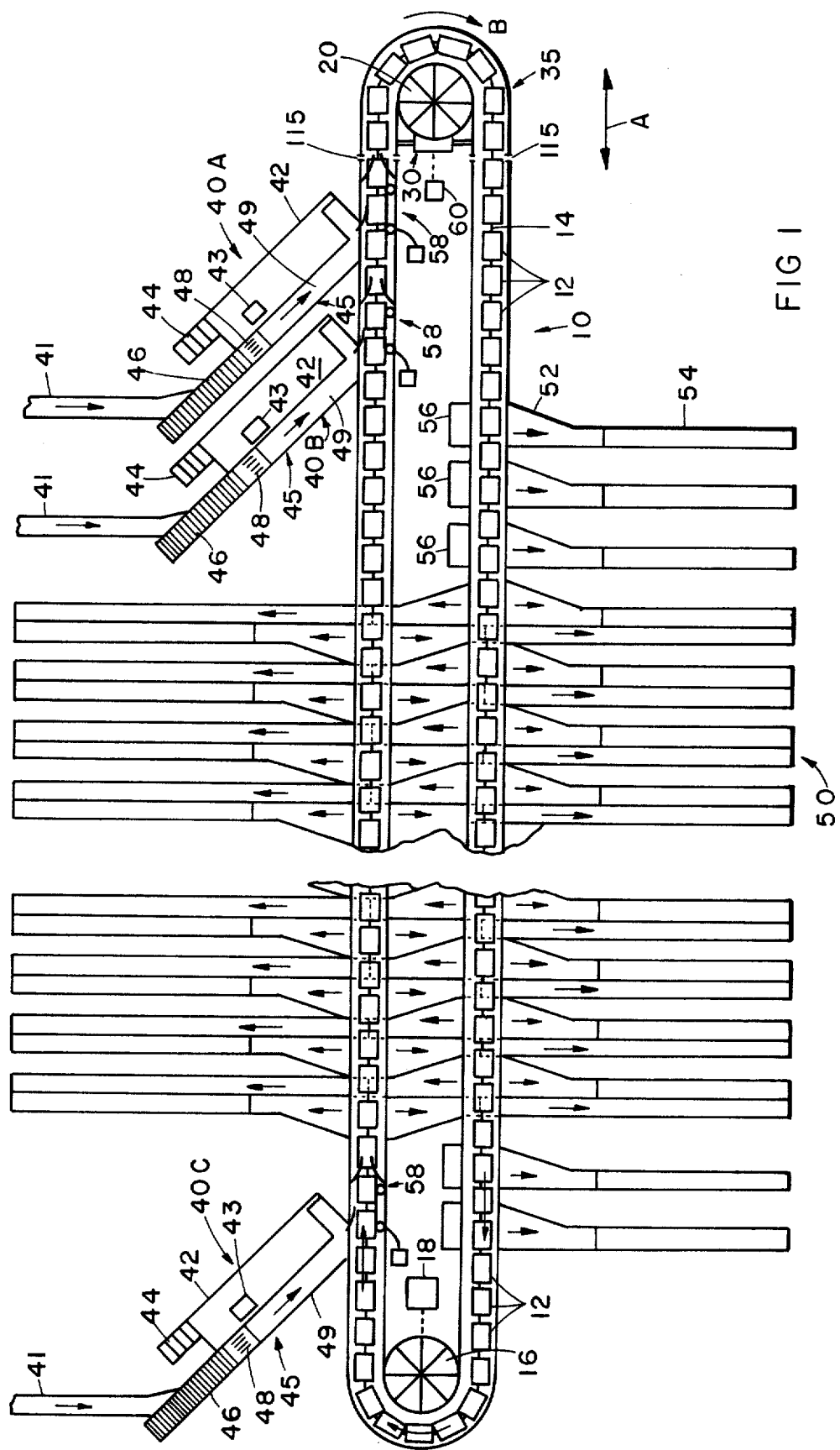
FIG. 1 is a plan schematic view partly broken away of a sorting conveyor system embodying the present invention.

Referring now in detail to FIG. 1, there is shown an endless loop sorting conveyor 10 which includes a plurality of article carrying trays 12 transported around the conveyor by means of an endless loop chain 14 guidably positioned over end sprockets 16 and 20. The chain is movable within a suitable supporting frame and is driven by the drive sprocket 16 at the left end of the system as shown in FIG. 1. A drive motor 18 is mechanically coupled to and rotates sprocket 16. The conveyor bed and chain support mechanism, as well as the apparatus coupling trays in a tiltable fashion to the chain, can be of the type described in detail in U.S. Pat. No. 3,034,665 issued to R. L. Speaker on May 15, 1962.

Sprocket Sprocket provides guided chain support at the right end of the conveyor and is mounted on a sliding carriage to provide a take-up mechanism 30 which is longitudinally movable together with the end section 35 of the conveyor supporting structure in a direction indicated by arrow A. Take-up mechanism 30 includes means 60 indicated in block form in FIG. 1 to maintain constant tension on the chain 14 as it varies in length during use.

Adjacent the upper and lower (in FIG. 1) legs of the endless conveyor are a plurality of interleaved discharge chutes 50 extending from fixed discharge locations on the conveyor at either side. Chutes 50 each include a widened mouth 52 and a run-out chute 54 which communicates with an article gathering area (not shown) for collecting sorted articles for shipment to predetermined destinations. Associated with each of the discharge chutes 50 at a fixed discharge location is a tilt-up mechanism 56 (shown in block form in FIG. 1) which can be of the type described in the above identified patent. Each of the tilt-up mechanisms 56 can be actuated when the article carrying tray momentarily aligns with a desired discharge chute to tilt the tray as it passes to discharge the contents of the tray to one of the discharge chutes on the left or the right side of the conveyor.

The sorting conveyor system includes three induction stations 40A, 40B and 40C. Stations 40A and 40B are adjacently positioned on the right end of the conveyor and induct articles on alternately spaced empty trays. The single induction station 40C is positioned on the opposite end and can induct articles on empty trays passing thereby. Each of the induction stations transfers cartons, boxes or other articles from in-feed conveyors 41 to the article carrying trays 12 of the sorting conveyor 10 and includes an operator platform 42 with access stairs 44. an induction line 45 of each induction station comprises a powered input conveyor 46, a powered indexing stop 48, and variable speed output feed conveyors 49. Positioned on each of the operating platforms is an operator control console 43 including a data keyboard for providing destination code information to the sorting conveyor control for each article that is inducted onto a tray of the sorting conveyor. Each of the induction stations is substantially identical and is described in detail together with the article aligning mechanism 58 positioned downstream from each of the induction stations of the clockwise moving conveyor in the copending patent applications identified supra, both of which are assigned to the present assignee and are incorporated herein by reference.

The operation of the induction stations is not presented in detail here, however, it is noted that each induction station receives randomly arriving articles and synchronizes the transfer of the articles onto an empty sorting conveyor tray as it passes by an end of the induction station. Simultaneously, operator keyed information from the data keyboard applies article destination code information to a sorting conveyor computer control for identifying the assigned discharge point of the article with respect to a correspondingly addressed destination chute. The aligning means 58 serves to position the article on one of the trays 12 such that when the tray is tilted at the predetermined discharge chute, it will be properly discharged into the mouth of the chute.

As will be described in greater detail below, the control of the tilting mechanisms 56 to discharge articles from a tray is achieved by predicting the position of a tray relative to the fixed positioned discharge chutes and when an article having a predetermined destination code is predicted to be in alignment with one of the discharge chutes having a correspondingly assigned destination code, the tilting mechanism is actuated to discharge the article. It is seen that with such a system it is necessary to accurately predict the position of the tray for any given instant of time. The position of the tray at a given incident of time and a given reference location on the conveyor can be employed. In relatively long conveyor systems such as the one described herein (which exceeds 2000 feet) however; variations in the length of the chain caused by stretching when under constant tension during operation, introduces spacing errors making accurate prediction of the tray positions impossible. To overcome this problem, compensation mechanism is provided to provide chain length change information to control the diverting of articles and also maintain the drive chain tension constant. The chain take-up mechanism shown in block diagram in FIG. 1 is shown in detail in FIGS. 2 through 7 which are now described.

Figure 4:
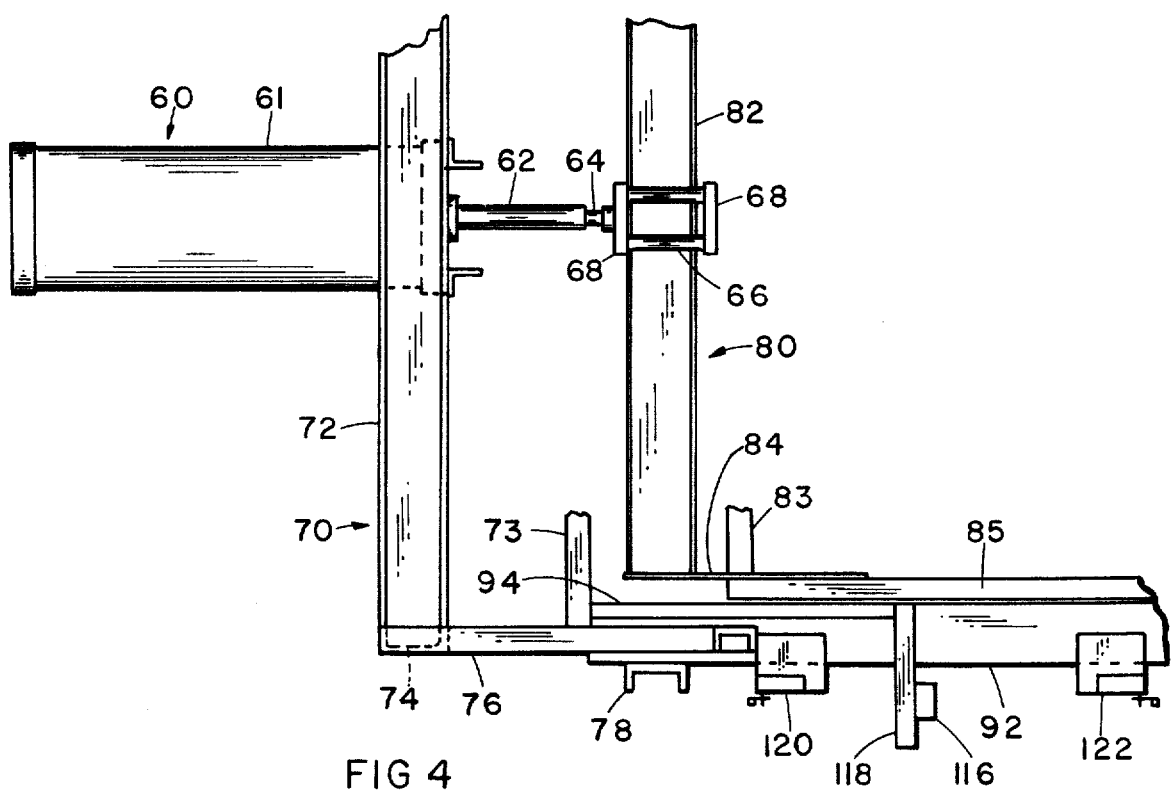
FIG. 4 is a fragmentary plan view of the take-up assembly shown in FIG. 3.
Figure 3:
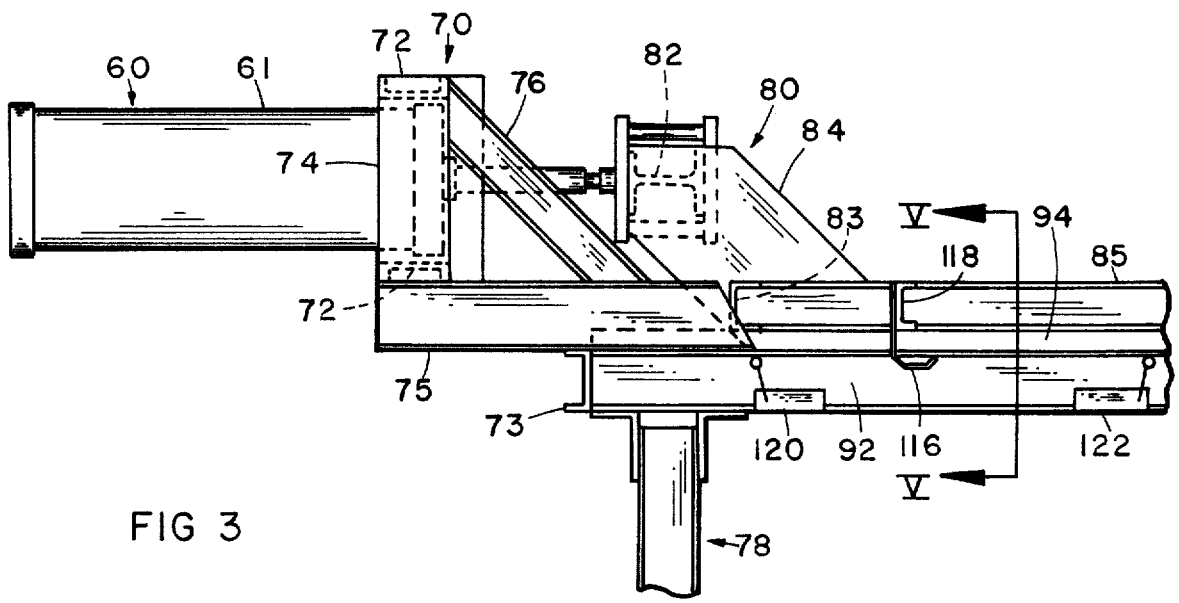
FIG. 3 is a fragmentary right side elevation view of the take-up assembly shown in FIG. 2.

Referring specifically now to FIGS. 2, 3 and 4, there is shown the take-up end of the sorting conveyor 10 shown in FIG. 1. The take-up assembly 30 includes drive means such as a hydraulic cylinder 60 with a movable shaft 62 coupled between the cylinder 60 and a movable carriage assembly 80. The cylinder housing 61 is supported on a fixed frame 70 comprising a rectangular framework having a pair of spaced horizontal members 72 and vertical end members 74 extending therebetween. The framework is coupled to a pair of horizontal struts 75 (FIG. 3) by means of angle brackets 76 on either end thereof. The rectangular cylinder frame thus formed is elevated above the surface of the floor 65 of the installation to the level of the conveyor bed 110 (FIG. 2) by means of a platform 77 formed of vertical legs 78 and cross members 79.

Figure 6:
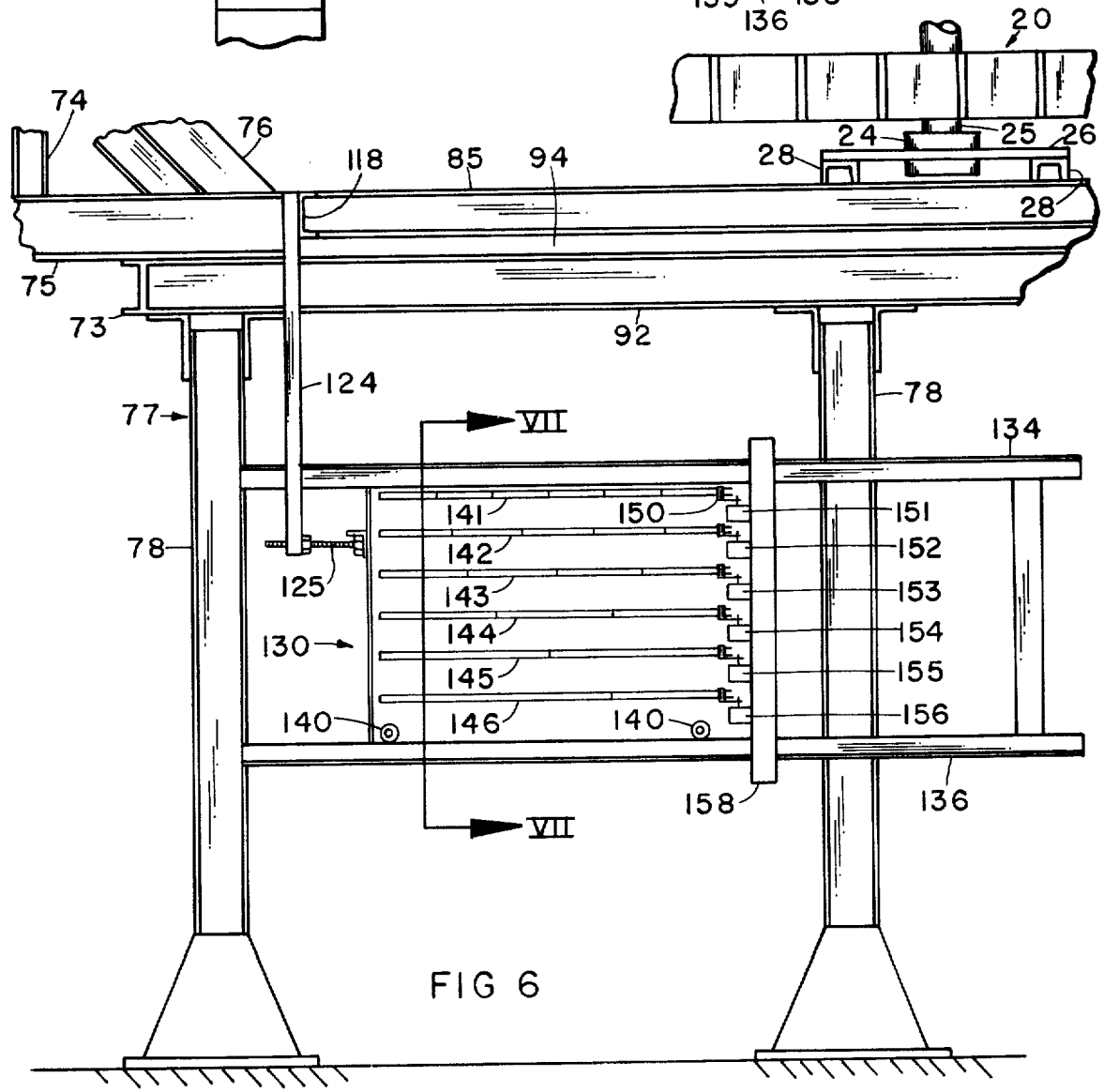
FIG. 6 is a side elevational view of a portion of the take-up assembly shown in FIG. 2 showing chain length detecting means employed therewith in front elevation.

As seen in FIG. 6, the platform 77 extends toward the end of the conveyor and the supports 75 of the cylinder frame are rigidly positioned on horizontal support members 92 extending longitudinally and supported by vertical legs 78. Cross member 73 (FIGS. 3 and 4) extends between members 92 to provide lateral support therebetween.

Figure 5:
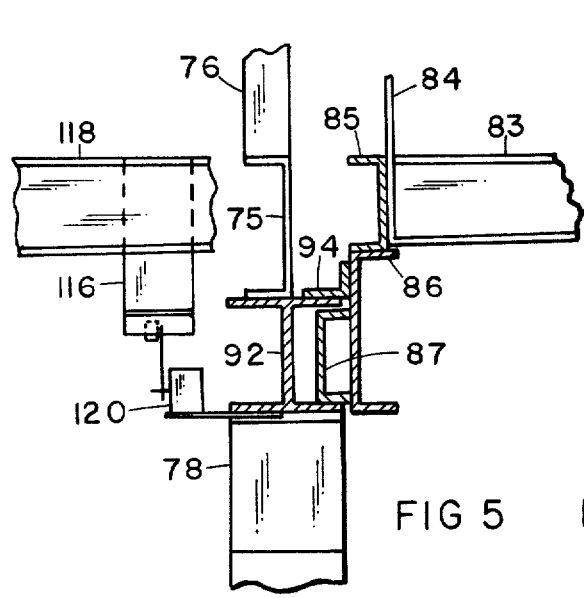
FIG. 5 is a fragmentary sectional view taken along the section lines V—V in FIG. 3.

Coupled to the end 64 of cylinder shaft 62 by means of suitable bolts 66 extending between support plates 68 (FIGS. 3 and 4) is a cross member 82. This mechanical coupling joins the movable carriage assembly 80 on which the sprocket 20 is positioned to the fixed platform 77 via cylinder 60. It is noted here that the carriage 80 and fixed frame 70 are substantially symmetrical thus only one side is shown in detail in FIGS. 3 through 5. Cross member 82 comprises an I-beam, as seen in FIGS. 3 and 4, which is supported between a pair of end members 84 (one shown). Attached along a bottom edge of each of the support members 84 is a channel member 85 which in turn is attached to a second channel member 86 as seen in FIG. 5. A second cross member 83 extends between members 85 for additional support for carriage 80.

Rigidly attached to the outer surface of channel member 86 is an additional channel member 87 (FIG. 5) which serves as guide and support means for slidably supporting the carriage assembly 80 within the channels of the I-beams 92 on fixed platform 77. The various channel members and support brackets are securely attached to one another by welding or other suitable means. The interface between beams 92 and members 87 are greased to facilitate sliding movement of the carriage with respect to the platform. Angle iron members 94 (one shown) are welded along the top of beams 92 as seen in FIGS. 3, 5 and 6, to provide a lateral guide for the carriage 80 when moving along beams 92.

The carriage assembly 80 includes thereon support members 88 (FIG. 2) which extend laterally outwardly from members 85 to support the tray carrying drive chain, the trays and guiding mechanism therefor at the movable end 35 (FIG. 1) of the sorting conveyor. Support arms 89 (FIG. 2) extend between the outwardly extending arms 88 and vertical support brackets (not shown) also coupled to the carriage assembly.

The sprocket 20 (FIGS. 1, 2 and 6) which includes a plurality of chain engaging teeth 22 around its peripheral edge, is rotatably supported on the movable carriage 80 by a shaft 25 (FIG. 6) fitted in a suitable bearing block assembly 24. Bearing block 24 is supported on a platform 26 which is positioned on transverse support members 28 positioned on the members 85 of the movable carriage. A semicircular edge guide 90 (FIG. 2) is attached to the carriage 80 by means of a shaft 92 extending from sprocket 20 and which is isolated from the rotational movement of the sprocket 20 by means of suitable sleeve bearings 94. A spider arm assembly 96 extends outwardly from shaft 92 to support the edge guide which moves longitudinally with the motion of the carriage but does not rotate with the rotating sprocket 20. Legs 98 (FIG. 2) extend between arms 88 of the carriage 80 and edge guide 90. The rotation of sprocket 20 is in a clockwise direction to cause the trays 12 to move around the take-up end of the conveyor in a direction illustrated by arrows B as seen in FIGS. 1 and 2.

Positioned near the outer ends of extending members 88 are a pair of inner chain guide members 100 (FIG. 2). Outer edge guides (not shown) also are provided and are attached to the ends of arm 88 to define a channel between the inner and outer edge guides for providing lateral guided support for the chain in its motion between the fixed conveyor supports and the sprocket 20. To provide vertical support for the trays on the movable carriage member, each of the tray support brackets coupling the trays 12 to the chain 14 includes a plurality of rollers 15 (FIG. 2) which contact support surfaces of the edge guides to stabilize the tray movement around the movable end 30 and the remainder of the conveyor 10. The structure which is employed for this purpose can be similar to that described in greater detail in the Speaker patent identified above.

Along the longitudinally extending fixed legs and the drive end of the conveyor 10, conventional support and guide means 110 are provided to guidably support the chain and trays thereon. The support and guide means 110 are supported along the length of the conveyor by a plurality of spaced stancheons 112. The structural details of suitable fixed chain guide and support means is described in greater detail in the speaker patent identified above. The separation point 115 (FIGS. 1 and 2) between the movable end 35 and the remaining fixed portion of the conveyor is bridged by suitably interleaved sliding support members which can be extensions of members 100 and 110 such that, as the section 35 moves to the right (in FIG. 1) as the chain stretches, tray support is provided across the otherwise resulting gap.

As seen in FIGS. 3, 4, 5 and 6, the longitudinally extending channel member 87 of carriage 80 fits within the channel forming one side of the stationary I-beam 92. Depending downwardly from the movable member 85 of the carriage assembly 80 is a cam arm 116 which is coupled to the member 85 by means of a horizontal cross arm 118. Positioned on the fixed horizontal support beam 92 is a pair of limit switches 120 and 122 which are positioned to be actuated by arm 116 for the travel limits of the carriage assembly 80. These limit switches are employed to prevent the cylinder 60 from moving the carriage assembly 80 beyond the desired range of motion. Also extending downwardly from arm 118 is a vertical member 124 (FIG. 6) which is coupled to a slidable cam plate assembly 130 by means of a suitable bolt or the like 125. Assembly 130 serves as means for detecting the stretch of the drive chain 14 and for generating a signal representative thereof.

Figure 7:
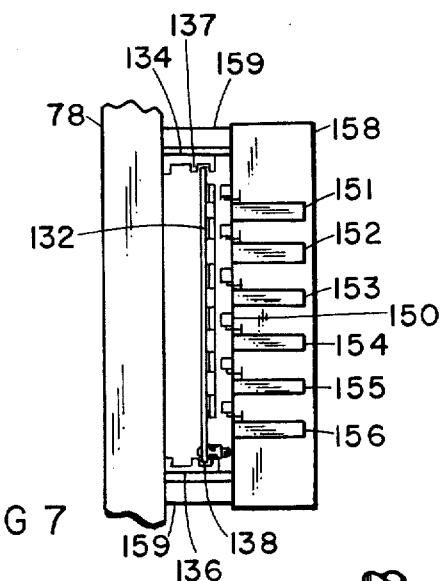
FIG. 7 is a fragmentary cross section view of the detecting means taken along the section lines VII—VII in FIG. 6.

Cam plate assembly 130 comprises a vertically oriented plate 132 slidably positioned between a pair of horizontal U-channel members 134 and 136 as shown in FIGS. 6 and 7 and guide bars 137 and 138. The support members 134 and 136 are rigidly attached to the vertical supports 78 as shown in FIG. 6. A pair of rollers 140 attached to plate 132 support its weight on the edge of member 136 and permit the sliding of the plate between members 134 and 136. Positioned on the cam plate 132 are six longitudinally extending cam members 141 through 146 which have camming surfaces formed therein that are adapted to engage and control follower arms 150 of each of a plurality of limit switches 151 through 156 associated with each of the cam strips. The camming surfaces are formed such that for each incremental distance traveled by the carriage, one of the limit switches will be actuated. The limit switches are fixedly positioned to a mounting bracket 158 coupled to support members 134 and 136 by members 159 (FIG. 7).

As the movable carriage 80 travels along the guide tracks 92, the cam plate assembly 130 passes under the limit switches 151 through 156 to cause selective actuation of these switches to generate a 6 bit gray code signal which uniquely identifies each incremental motion travel of the carriage assembly. As will be described hereinafter, the detector 130 is employed to generate chain stretch information employed by the computer control to accurately discharge articles onto the desired discharge chutes as the chain length varies.

Figure 8:
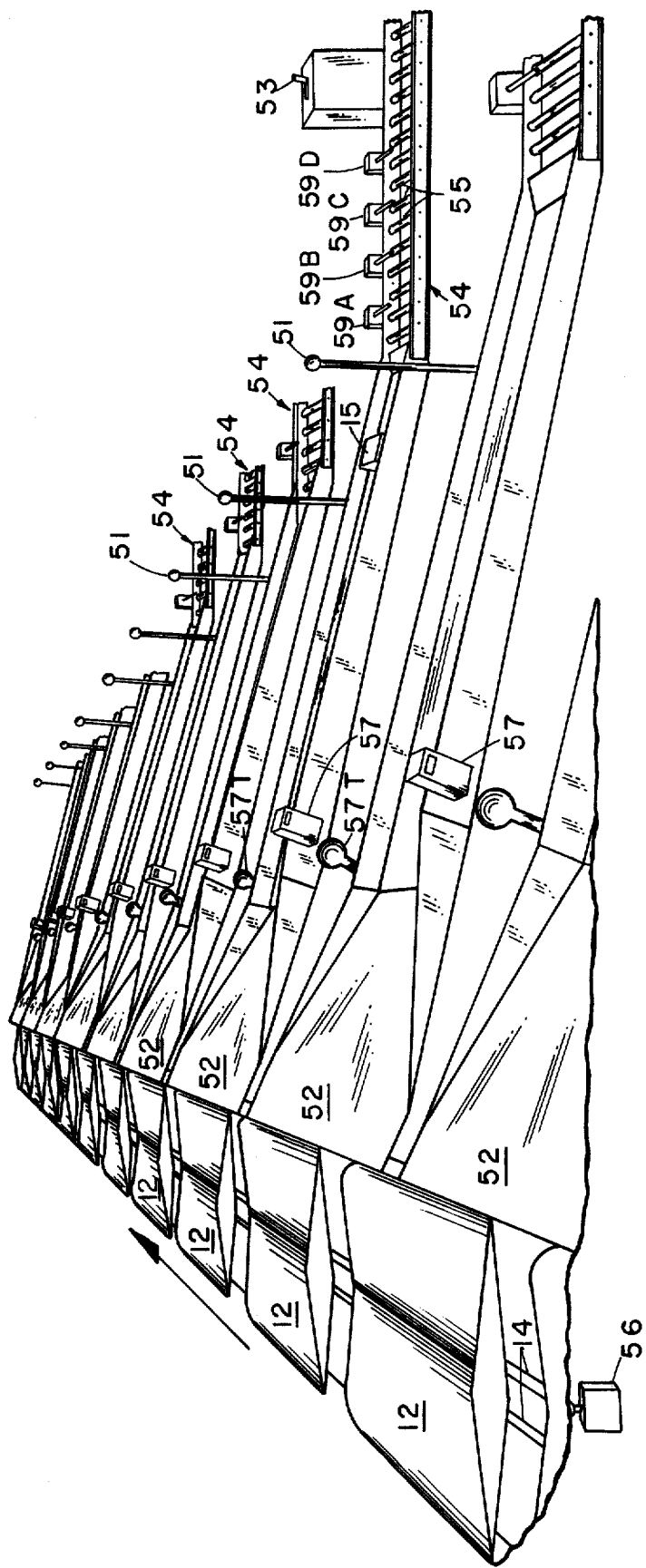
FIG. 8 is a fragmentary perspective view of a portion of the sorting conveyor of FIG. 1 showing the discharge and run-out chutes positioned adjacent the conveyor.

Having described the take-up assembly which maintains constant chain tension as the chain length varies for the sorting conveyor system, reference is had to FIG. 8 which shows a portion of one of the longitudinal legs of the conveyor system illustrating the position of the discharge and run-out chutes relative to the conveyor. In the figure, there is shown in detail one of the approximately 600 output chutes 50 which have widened mouth portions 52 that are aproximately 6 feet wide. The chutes are spaced at increments of 2 feet such that a two divert pulse system (as described below) can be employed with the trays which are 4 feet from center to center.

Each discharge chute extends downwardly away from the sorting conveyor and into a run-out chute 54 which can employ, for example, powered rollers 55 to remove diverted (sorted) articles 15 to a dispatching area (not shown) associated with one or more run-out chutes. Suitable edges extend upwardly on either side of the discharge and run-out chutes to prevent articles from sliding off. A jam detector 57 which may comprise a photoelectric detector having a light source and photocell, and a target 57T positioned across the chute from the detector unit is located in the mouth portion 52 of each discharge chute 50. In the event that an article becomes lodged obliquely in the discharge chute for some reason, the jam detector inhibits the operation of the diverter 56 associated with the jammed discharge chute until the chute mouth is cleared.

In addition to the jam detector, each of the run-out chutes include four spaced fill-up detectors 59A, 59B, 59C and 59D which detect the backing up of cartons along the run-out chutes. These detectors can be photoelectric or mechanical limit switches which are employed to inhibit the divert mechanism when detectors 59A and 59B are simultaneously actuated thereby indicating that the run-out chute has been filled with articles and a backup exists at the dispatch area. Detectors 59C and 59D can be employed to actuate warning lights which indicate to operating personnel that the removal of articles from the dispatching area must be speeded to make room for more articles from the run-out chutes. Other control effects such as increasing the speed of the roller conveyor 55 of the run-out chute to clear the chute can likewise be provided.

Each of the run-out chutes also includes a last carton indicator light 51 which is automatically illuminated when the last carton of a shipment has been diverted into the chute. A last carton switch 53 is provided along each of the run-out chutes to permit operators to deactivate light 51 once the carton has cleared the chute which is then ready for a different shipment. Switch 53 is also coupled to a control panel 53' to provide information thereto such that a new order can be assigned the chute once one shipment is completely sorted. Having described the mechanical features of the sorting conveyor, a description of the control of the conveyor system follows and can best be understood by by referring to FIGS. 9 through 14.

Figure 9:
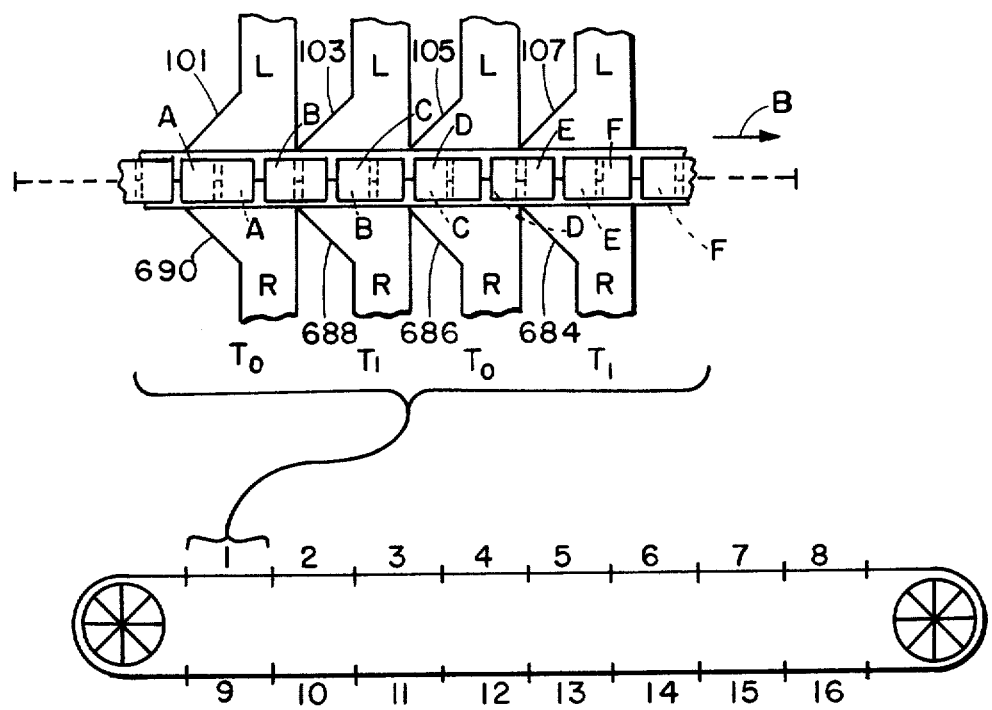
FIG. 9 is a schematic view showing the division of the conveyor into discharge zones and the subdivision of one of the zones into discharge locations.

Referring specifically to FIG. 9, there is shown a schematic diagram of the sorting conveyor 10 which is divided into 16 fixed discharge chute zones consecutively numbered 1 through 16 in the figure. Each of the zones can include up to 24 pairs of left and right discharge chutes totaling 48 individual discharge chutes. As will be described hereinafter, the zones are employed for simultaneously tilting desired aligned trays within the various zones at an instant of time which is selected to compensate for drive chain length variations. An enlarged section of the first zone is also shown in FIG. 9 together with four pairs of left and right chutes identified by the chute identification numbers 101 through 107 for the left chutes and the correspondingly aligned right chutes 690 through 684. The direction of tray movement is in the direction of arrow B in FIG. 9.

Since the chutes are adjacent and are 6 feet wide, it is seen that for a given instant of time where a tray is in alignment with one of the alternately spaced chutes, the next adjacent tray which is spaced 4 feet from the aligned tray will be aligned with the next adjacent chute at a discrete time interval thereafter. Since the conveyor speed is approximately 240 feet per minute, every half second time interval the trays will move approximately 2 feet to align alternate trays with alternate chutes. Thus, a two pulse divert system can be employed.

To accommodate such a system, each of the discharge chute pairs for each zone 1 through 16 is assigned a $T_0$ divert pulse designation or a $T_1$ divert pulse designation. In FIG. 9 in zone 1, for example, at a given instant of time, trays identified as A and D are respectively aligned with pairs of chutes 101, 690 and 105, 686 and can be diverted to the left or right by a $T_0$ pulse applied to the tray diverters at these locations and at this instant of time. One half second later, however, all of the trays will have been shifted approximately 2 feet as indicated in dashed lines such that tray B will be aligned with discharge chutes 103 and 688 and can be diverted to one or the other of these chutes by a $T_1$ divert pulse at this later instant in time.

Figure 12:
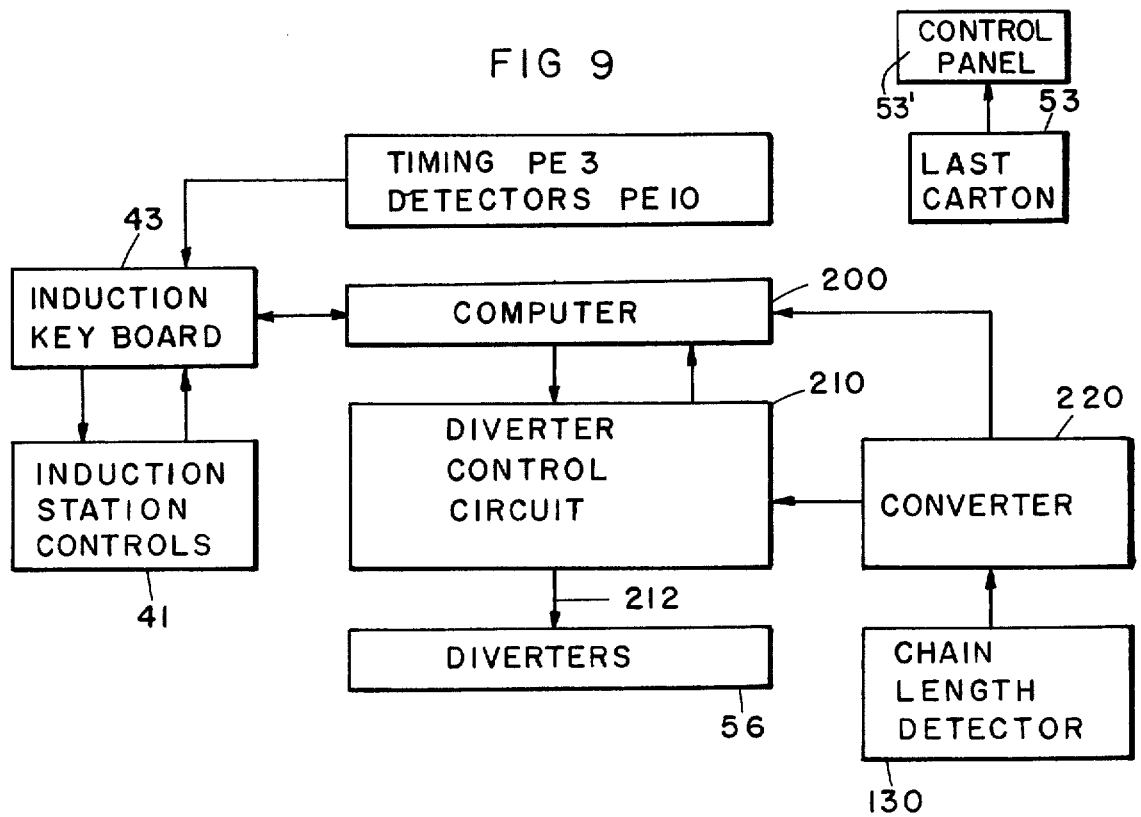
FIG. 12 is an electrical circuit diagram in block form of the control circuits used in the present invention.
Figure 11:
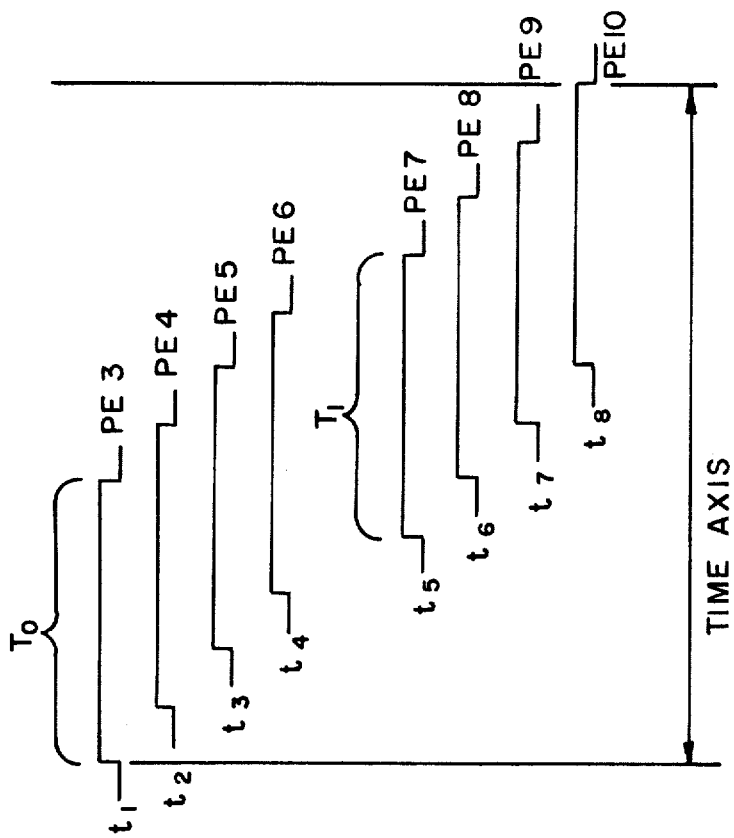
FIG. 11 is a timing diagram.
Figure 10:
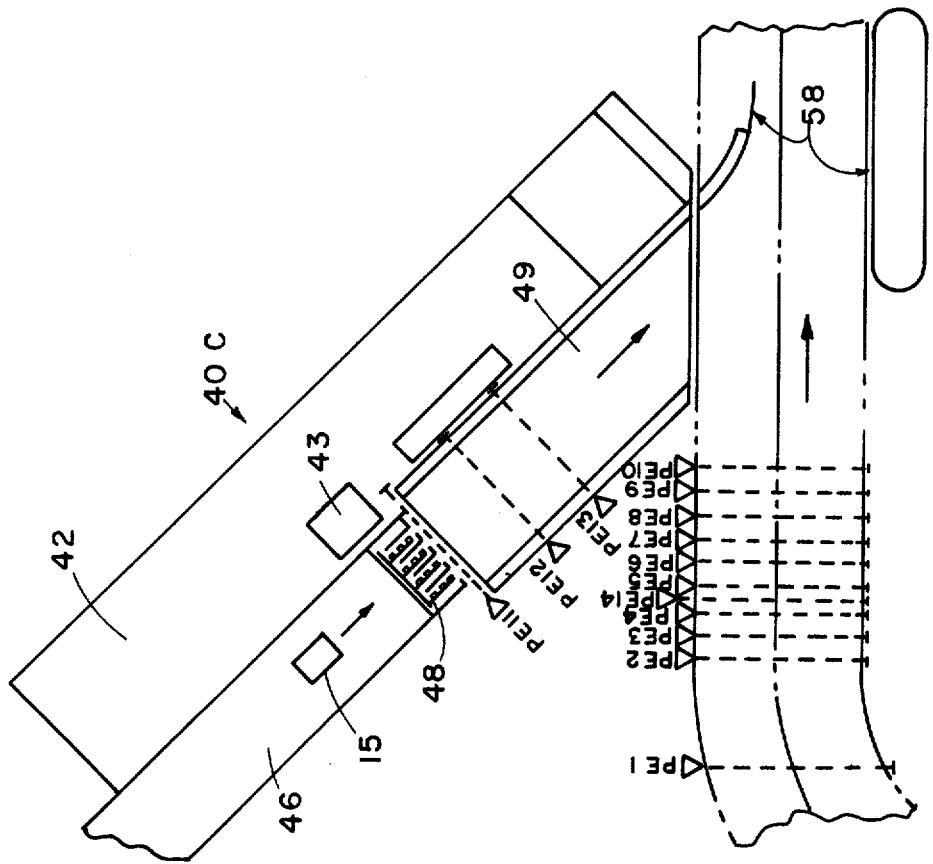
FIG. 10 is a plan schematic view of an induction station and a plurality of tray sensors positioned adjacent the sorting conveyor.

Referring now to FIGS. 10, 11 and 12; means for predicting the aligned position of trays to generate a divert signal causing preselected trays to tilt and discharge cartons having a preassigned destination onto aligned corresponding preassigned discharge chutes is discussed together with the control employed to compensate for chain length variations. Referring first to FIG. 12, it is seen that the system includes a data generating keyboard 43 for each of the induction stations (one is shown in the figure). The induction keyboard is actuated by the operator to feed article destination information data to the computer control 200 which includes a memory circuit for storing the destination information of an article positioned on each of the trays, as well as the corresponding address for each of the discharge chutes.

Each induction station includes controls 41 to provide send, last carton, look-up and other computer controlling information as described in the copending applications identified supra. The timing detectors or sensing means PE3 through PE10 are coupled to the computer 200 via suitable signal processing means and detect trays to provide timing information to the computer as the trays pass the known reference points at which the detectors are located. These detectors are spaced at 6 inch intervals along the conveyor side as seen in FIG. 10. Detectors PE1, PE2 and PE11 through 14 are employed with the induction station 40 to synchronize the induction of cartons onto trays as described in detail in the above identified copending patent applications.

Referring now specifically to FIG. 11, it is seen that the two divert intervals $T_0$ and $T_1$ are each divided into four timing interrupt subintervals identified as $t_1$ through $t_8$. When no chain stretch has taken place, the generation of the $T_0$ and $T_1$ divert signals will be triggered when a tray passes the detectors PE3 and PE7 (i.e., a $t_1$ or $t_5$ interrupt signal). As the drive chain varies in length, however, the resulting spacing error is compensated for by employing one of the remaining interrupt photocells PE4 through PE6 to trigger the generation of the $T_0$ divert signal or PE8 through PE10 for the $T_1$ divert signal at a different instant of time. Thus, there are eight possible divert instants for each second of operation of the sorting conveyor and which are selectively utilized depending upon the detected chain stretch. It is apparent that a tray carrying an article destined for a predetermined discharge chute during its travel of approximately 6 inches in one-eighth of a second, will align with the desired chute at one of the timing interrupts during cycle of travel around the conveyor.

The chain length detecting mechanism 130 shown in FIGS. 6 and 7 is electrically coupled to a converter circuit 220 (FIG. 12) which converts the gray code information into control signals applied to the computer control circuit 200. Depending upon the chain stretch, various of the timing interrupt photocells are selectively employed to trigger the generation of the $T_0$ and $T_1$ divert signals applied to the diverters 56 of each divert location in zones 1 through 16. The diverter control circuit 210 is coupled to computer 200 and has output terminals coupled to each of the diverters 56 by means of a multiple conductor cable 212.

The operation of the system employing the timing detectors, the various divert zones, the chain length information and the $T_0$ and $T_1$ divert signals that are applied as a function of the timing interrupt signals, can be understood by the following example. With no chain stretch, zones 1 through 8 having a $T_0$ divert designation will be diverted when detector PE3 is actuated by a tray passing thereby (generating a $t_1$ interrupt) and the computer detects coincidence between the assigned destination code for trays in these zones and correspondingly assigned addresses for the discharge chutes of these zones. PE3 is positioned to assure this alignment of predetermined known trays with the $T_0$ discharge chutes as a tray interrupts the detector. PE7 is positioned to control the diverting of the $T_1$ designated zones 1 through 8 with no chain stretch by providing a $t_5$ timing interrupt for controlling diverters at $T_1$ destined discharge locations in these zones. Discharge locations in zones 9 through 16 having a $T_0$ designation will have diverters actuated by a timing interrupt pulse $t_3$ generated by the interruption of PE5 by a tray while the zone 9 to 16 chutes designated by $T_1$ will be diverted upon the receipt of a timing interrupt signal $t_7$ due to the interruption of photocell PE9.

When, however, the drive chain 14 has stretched 6 inches, for example, the computer 200 receives this information from the chain length detector 130 (FIG. 6) via circuit 220 and recalculates the zones that are to be diverted as well as the interrupt pulse employed to generate the divert signals. Thus, for example, with a 6-inch chain stretch, zones 1 through 4 assigned $T_0$ will be diverted with a $t_1$ interrupt pulse while zones 5 through 8 will be diverted with a $t_8$ interrupt pulse. Likewise, the zones 1 through 4 with a $T_1$ designation will be diverted by a $t_5$ interrupt while zones 5 through 8 with a $T_1$ designation will be diverted upon the receipt of a $t_4$ interrupt.

Similarly, zones 9 through 16 with $T_0$ and $T_1$ designations will be selectively diverted upon the receipt of timing interrupts depeding upon the recalculated predicted aligned positions of the destination addressed trays and the correspondingly addressed discharge chutes. It is noted here that the computer calculations are performed at least a second before the actual tray divert to enable the diverting circuit to be conditioned for operation at the desired instant. The portion of the diverter control circuit 210 which is employed to control diverters at four of the discharge chutes at two divert locations is shown in FIG. 13.

Referring now to FIG. 13, there is shown a portion of the divert control circuit 210 (FIG. 12) which is employed to control the tray tilt-up mechanism 56 for two divert locations and the four discharge chutes numbered 101, 103, 688 and 690 in FIG. 9. It is understood that the remaining sections of the control circuit are substantially identical to the portion shown in FIG. 13 which is duplicated for each pair of the approximately 300 divert locations. The circuit shown in FIG. 13 includes divert right, divert left, and last carton circuit boards 232, 234, 236 respectively. Each of these circuit modules include shift registers, logic circuits, and relay drive circuits for converting computer output control words into control signals for actuating the right, left and last carton relays 242, 244 and 246 respectively.

In operation, each of the circuit boards 232, 234 and 236 receive signals from the computer 200 (FIG. 12) for left, right, last carton and output divert, the latter of which is present when the tray destination information compares with the aligned chute positions. When, for example, a tray is predicted to be aligned with chute 101 of the sorting conveyor system (FIGS. 9 and 13) and its article destination code corresponds to the address of chute 101, a left divert control word from the computer actuates relay drivers in circuit 234 to set relay 244 by grounding one of the relay coil terminals which has its opposite terminal coupled to the +12 volt supply shown in FIG. 13. The contacts 243 of relay 244 switch to the actuated position (opposite that shown in FIG. 13) to complete a circuit path through a pair of selectively actuated A.D. switches ACS1 and ACS2 from a 110 volt supply to the solenoid actuation valves 250 associated with the tilt-up mechanism for chutes 101 and 103.

It is noted here that the A.C. switches, which can be triacs, are not actuated when the tilt-up relays are set but are at some later time when the actual coincidence between the tray and the desired output chutes occurs during one of the timing interrupts $t_1$ through $t_8$. At this time, a 4-bit control word is applied to one of the A.C. switches via a decoding network 238 thereby actuating (for the example given) ACS2 which applies power through relay contacts 243, one of a series of diodes 260, normally closed contacts 254, 258 and 259 and a diode 256 to actuate the tilt-up solenoid 250 for discharge chute 101 causing the carton on the tray passing thereover to be discharged to the left onto chute 101.

The jam detector 57 (shown in FIG. 9) includes a control switch 254 which is in series with the solenoid 250 such that in the event that the chute is jammed by an article, switch 254 will open to inhibit the tilting mechanism. Likewise, in the event that the three-quarter full and full run-out chute detectors 59A and 59B (FIG. 9) detect the presence of articles, the associated switch contacts 258 and 259 will simultaneously open thereby inhibiting the operation of the tilt-up solenoid 250.

In the event that the carton to be diverted is, in addition, the last carton of a shipment sorted via chute 101, a last carton word from the computer coupled to circuit 236 actuates relay 246 which closes the associated contacts 247 thereby shunting the plurality of diodes 260 which are in series between the contacts of relays 242 and 244 and the associated tilt-up solenoids. Thus, full-wave alternating current is applied from the A.C. switches instead of negative half-wave rectified power (through diodes 260).

The negative portion of the alternating current passes through diode 256 to actuate the tilt-up solenoid in the normal manner while the also present positive portion actuates a relay 264 through diode 265. Relay 264 latches on by means of contact 266 coupled to the A.C. supply. Contacts 267 also associated with relay 264 actuate the bulb 268 of the last carton indicator light (51 in FIG. 9). This light remains on until the operator has cleared the run-out chute of the shipment and actuates switch 53 suitably coupled to relay 264 to open contacts 266 and 267 and also provides a signal indicating the availability of the chute for a different order at a suitable remote indicator panel (not shown).

Each of the discharge chutes includes elements similar in structure and operation to elements 250 through 268 for chute 101 such that the tilt-up mechanism is actuated by the computer in timed coincidence with the alignment of a tray carrying a carton addressed to the chute and the chute, only when the chute is clear.

Figure 14:
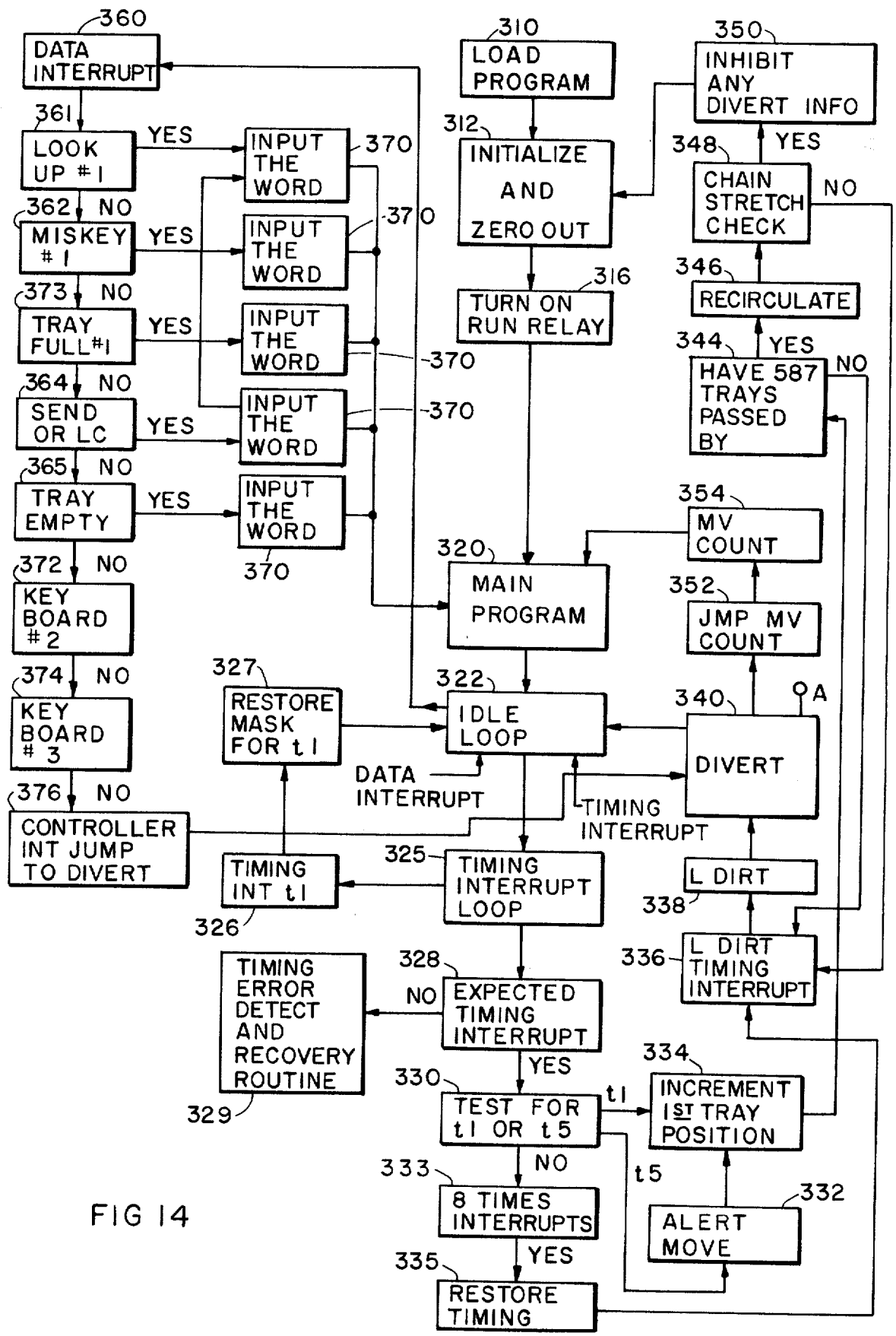
FIG. 14 is a flow diagram of the computer processing employed with the present invention.

Referring now to FIG. 14, there is shown the logic flow diagram for the operation of the computer employed to predict the alignment of trays with correspondingly addressed discharge chutes and for recalculating the alignment information when the drive chain varies in length. First, the program in the form of a prerecorded tape, punch cards or the like is loaded as indicated by the block 310. The program is initialized as indicated by block 312 by zeroing the buffer registers, setting the counters, setting the various timing masks, clearing the keyboard input flags and setting the initial chain length information into the system. The old computer information is zeroed out and new segment timing information is calculated in accordance with the new chain stretch information.

Once the initial conditions are set, the run relay for the sorter is actuated (block 316). The main program indicated at block 320 calculates the output divert information for the preceeding second and is interfaced with an idle loop 322 which receives a data interrupt from the induction keyboard as indicated in the block diagram of FIG. 12, and chain length information from the chain length detector also indicated by the block diagram of FIG. 12. When the computer program is initialized, the program ignores all timing interrupts until a $t_1$ interrupt occurs which synchronizes the program with the conveyor. The next tray which interrupts the first timing detector (PE3) is then designated as tray number 1 within the program and reamins tray number 1 until the program is once again initialized. The program keeps track of the first tray's position with a counter which is updated for every 2 feet of conveyor movement by the timing detectors PE3 through PE10 (FIGS. 10 and 12).

From the idle loop 322, the program follows the normal timing interrupt loop 325 which includes the start-up synchronizing routine identified above which includes the timing interrupt detecting stage 326 and the restore mask block 327. The normal timing routine includes the expected timing interrupt detection stage indicated by block 328 and the test for a $t_1$ or $t_5$ interrupt indicated by block 330. In the event that a $t_1$ or $t_5$ interrupt occurs when expected, the program either follows the alert move control (block 332) which is a subroutine which changes the divert routine exit from field test to move control or directly to the "increment first tray position" counter 334.

From this block, the program detects whether or not all of the 587 trays have passed the reference position and if not, the program goes back to the load direction table timing interrupt 336 which identifies the timing interrupt for the LDIRT routine indicated by clock 338. The LDIRT routine identifies the number of segments to be diverted and which segments they are. The program then proceeds to the DIVERT routine 340 which outputs a control word, a left divert, a right divert and last carton word to each of the divert location segments via terminal A and the plurality of circuits as shown in FIG. 13 and as directed by the LDIRT routine 338. It then initiates the correct time divert pulse for the timing interrupt and controls the Jump MV subroutine 352 which changes the divert exit address back to a field test routine while the MV CONT subroutine 354 moves the next full second's calculated information from field 1 to field 0. The program then goes to the main program which calculates the following full second's information. In this manner, the information is calculated at least a full second in advance to the actual divert signal generation.

If one cycle of operation has been completed as indicated by the detection of 587 trays passing by a reference timing detector (block 344), then the program travels through a recirculate routine which resets the first tray position counter and the program checks the inputted chain length information to see if the chain has stretched 3 inches or greater from the last cycle of operation. It is noted here that each cycle of the conveyor takes approximately 10 minutes.

In the event the chain has not stretched greater than 3 inches, the information is recirculated to the load direction tables timing interrupt 336 which uses the same timing interrupts for the load direction tables program.

In the event the chain has elongated by 3 inches or more, however, this information is employed to inhibit the generation of additional divert information as indicated by block 350, until the predicted alignment of the trays with the respective discharge chutes can be recalculated for the change of the chain length.

In addition to the normal timing routines, the program of the computer includes a data input loop which is interconnected with the data keyboard for each of the induction stations to receive coded destination information for each article and the tray on which the article is inducted. Thus, from the idle loop 322, the program looks for a data interrupt as indicated by block 360 which identifies one of the five possible interrupts from one of the three keyboards. The five interrupts for one of the keyboards are indicated by blocks 361 through 365 and include the actuation of a look-up key by the operator, the actuation of a miskey by the operator, actuation of a tray full detector (PE1), the actuation of the send key by the operator after a data code has been typed on the keyboard (normal operation), or the actuation of the tray present detector (PE11, FIG. 10). If any of these interrupts occur, the information associated with the particular interrupt which, in the event of normal induction operation where the operator has keyed in a destination code for the article, is a data signal identifying the article's destination corresponding to one of the assigned discharge chutes, is fed to the computer from the induction station as indicated by the input the word blocks 370. The second and third keyboards associated with the second and third induction stations, indicated by blocks 372 and 374, also include the five data interrupts which are coupled to the input the word block 370. In the event that none of the interrupts occurs, the program returns to the divert routine 340 through the controller interrupt jump to divert block 376.

It is seen, therefore, that the computer calculates in advance the predicted aligned position of trays for the $T_0$ and $T_1$ divert locations in various zones 1 through 16 (FIG. 9) of the conveyor and generates divert signals when it receives a timing interrupt corresponding to the predicted aligned position of trays with addresses which correspond to the divert locations. As the chain length varies and exceeds a predetermined distance, different timing interrupts $t_1$ through $t_8$ are employed for different zones to accommodate the chain length variations such that the predicted alignment of the trays with corresponding output chutes will remain accurate for the changing chain length. This information is updated for each cycle of the conveyor to maintain the divert accuracy of the system.

In addition, the compuuter receives information from each of the keyboards or other controls associated with each of the induction stations and described in greater detail in the above identified copending applications to correlate the destination code information assigned a particular article and identify the tray on which that article is inducted such that the divert calculation can be made. It is seen that with this type of system, a plurality of articles can be diverted for each of the eight timing interrupts, and the system is capable of being used with several induction stations and any desired chain length or number of discharge chutes and trays.

In the prefered embodiment described, in the event the chain stretches 4 feet or more, a tray is removed from the conveyor and the program initialized to take into account the different number of trays. The chain stretch information is also reset to reflect the take-up caused by the removal of the tray.

Various modifications to the preferred embodiment described herein can be made by those skilled in the art without departing from the spirit or scope of the present invention as defined in the appended claims.

What is claimed is:

1. A system for sorting articles inducted onto trays of a conveyor which pass a plurality of individual discharge chutes positioned adjacent the conveyor by diverting articles from preselected trays when in alignment with desired discharge chutes, said system comprising:

a conveyor segmented into a plurality of discharge zones along its length, wherein each discharge zone includes a plurality of alternately spaced first and second discharge locations, said conveyor including a plurality of trays and also including a conveyor drive member for transporting said trays along said conveyor and wherein means are provided for detecting changes in at least one dimension of said conveyor drive member which is subject to change during use;

a plurality of uniquely identified discharge chutes positioned along said conveyor in alignment with said plurality of discharge locations;

a single set of sensors for providing timing signals, said set comprising a plurality of spaced tray detectors each positioned at a reference location along a single segment of the conveyor and spaced a predetermined distance from an adjacent sensor to detect trays passing thereby, means coupling each detector with a plurality of discharge locations of one of said alternately spaced first and second discharge locations such that each alternate discharge location has a plurality of associated detectors;

means for providing article destination information which identifies at least one of said uniquely identified discharge chutes for each tray having an article inducted thereon;

control means coupled to said tray detectors and to said providing means and responsive to signals from said tray detectors for periodically generating first and second divert signals in response to the detection of a tray passing first and second detectors, respectively, of said set for simultaneously diverting articles from article carrying trays when in alignment with correspondingly identified discharge chutes at first and second discharge locations in preselected discharge zones at the time said first and second detectors, respectively, are actuated by said tray, and means for applying signals representative of detected dimension changes to said control means to selectively change the time of diverting of articles by developing said first and second divert signals upon detection of a tray by different detectors of said set to compensate for dimension variations of said drive member; and divert means positioned at each discharge location and coupled to said control means, said divert means responsive to divert signals from said control means to divert an article from a tray at said discharge location onto a discharge chute.

2. The apparatus as defined in claim 1 wherein at least some of said discharge locations have oppositely positioned discharge chutes and wherein said control means selectively develops divert signals for each of said discharge locations to actuate said divert means positioned at said discharge locations to divert an article onto a select one of said discharge chutes at said discharge location.

3. The apparatus as defined in claim 1 wherein said control means develops divert signals for said first discharge locations of preselected discharge zones when predetermined ones of said plurality of tray detectors detect a tray passing thereby and develops divert signals for said second discharge locations of preselected discharge zones when predetermined other tray detectors detect a tray passing thereby.

4. The apparatus as defined in claim 3 wherein said control means includes computing means for predicting the alignment of trays with corresponding discharge chutes and for controlling the generation of said divert signals for said discharge locations to occur in timed coordination with the predicted time of alignment when one of said tray detectors detects a tray passing thereby.

5. The apparatus as defined in claim 4 wherein said conveyor is an endless loop conveyor and said drive member comprises an endless loop to which said trays are coupled and which is supported between a pair of rotatable end members, one of which is lineally movable, and wherein said system includes means for shifting the position of said movable member to maintain relatively constant tension on said endless loop as its length varies during use.

6. A system for sorting articles inducted onto trays of a conveyor which pass a plurality of individual discharge chutes positioned adjacent the conveyor by diverting articles from preselected trays when in alignment with desired discharge chutes, said system comprising:

an endless loop conveyor segmented into a plurality of discharge zones along its length, wherein each zone includes a plurality of alternately spaced first and second discharge locations said conveyor including an endless loop conveyor drive member to which said trays are coupled for transporting said trays along said discharge chutes said endless loop drive member supported between a pair of rotatable end members, one of which is lineally movable, and wherein said system includes means for shifting the position of said movable member to maintain relatively constant tension on said endless loop as its length varies during use and wherein means are provided for detecting changes in at least one dimension of said conveyor drive member which is subject to change during use and for applying signals representative of detected dimension changes to said control means to selectively change the diverting of articles in a manner to compensate for dimension variations of said drive member;

a plurality of uniquely identified discharge chutes positioned along said conveyor in alignment with said plurality of discharge locations;

a plurality of sensing means positioned at predetermined reference locations along the conveyor to detect trays passing thereby;

means for providing article destination information which identifies at least one of said uniquely identified discharge chutes for each tray having an article inducted thereon;

control means coupled to said sensing means and to said providing means for generating first and second divert signals for article carrying trays in alignment with correspondingly identified discharge chutes at first and second discharge locations in preselected discharge zones when first and second ones of said sensing means are actuated wherein said control means develops divert signals for said first discharge locations of preselected discharge zones when predetermined ones of said plurality of sensing means detect a tray passing thereby and develops divert signals for said second discharge locations of preselected discharge zones when predetermined other sensing means detect a tray passing thereby, and wherein said control means includes computing means for predicting the alignment of trays with corresponding discharge chutes and for controlling the generation of said divert signals for said discharge locations to occur in timed coordination with the predicted time of alignment when one of said sensing means detects a tray passing thereby;

divert means positioned at each discharge location and coupled to said control means, said divert means responsive to divert signals from said control means to divert an article from a tray at said discharge location onto a discharge chute; and wherein said means for shifting the position of said movable end member comprises a fixed framework and a carriage on which said end member is rotatably coupled slidably positioned on said fixed framework; and wherein said detecting means comprises a generator including cam means positioned on one of said movable carriage or said fixed frame and follower means positioned on the other of said movable carriage or fixed frame to generate signals in response to the travel of said movable carriage on said fixed frame as the length of said endless loop varies during use.

7. The apparatus as defined in claim 6 wherein said endless loop is a chain having a plurality of links and wherein said follower means comprises a plurality of limit switches selectively actuated by said cam means to develop chain length representative signals therefrom.

* * * * *